(12) United States Patent
Biatek

(10) Patent No.: US 11,736,725 B2
(45) Date of Patent: Aug. 22, 2023

(54) METHODS FOR ENCODING DECODING OF A DATA FLOW REPRESENTING OF AN OMNIDIRECTIONAL VIDEO

(71) Applicant: TDF, Montrouge (FR)

(72) Inventor: Thibaud Biatek, Souligny (FR)

(73) Assignee: TDF, Montrouge (FR)

( * ) Notice: Subject to any disclaimer, the term of this patent is extended or adjusted under 35 U.S.C. 154(b) by 0 days.

(21) Appl. No.: 17/500,362

(22) Filed: Oct. 13, 2021

(65) Prior Publication Data

US 2022/0046279 A1 Feb. 10, 2022

Related U.S. Application Data

(63) Continuation of application No. 16/756,755, filed as application No. PCT/EP2018/077922 on Oct. 12, 2018, now Pat. No. 11,172,223.

(30) Foreign Application Priority Data

Oct. 19, 2017 (FR) ...................................... 1759822

(51) Int. Cl.
*H04N 19/597* (2014.01)
*H04N 19/174* (2014.01)
(Continued)

(52) U.S. Cl.
CPC ......... *H04N 19/597* (2014.11); *H04N 19/174* (2014.11); *H04N 19/176* (2014.11); *H04N 19/34* (2014.11)

(58) Field of Classification Search
None
See application file for complete search history.

(56) References Cited

U.S. PATENT DOCUMENTS

| 9,961,353 | B2 | 5/2018 | Bordes et al. |
| 10,728,565 | B2 | 7/2020 | Lee et al. |

(Continued)

FOREIGN PATENT DOCUMENTS

| CN | 102577376 A | 7/2012 |
| CN | 105308966 A | 2/2016 |

(Continued)

OTHER PUBLICATIONS

International Search Report and Written Opinion dated Nov. 27, 2018 for corresponding International Application No. PCT/EP2018/077922, filed Oct. 12, 2018.

(Continued)

*Primary Examiner* — Christopher Braniff
(74) *Attorney, Agent, or Firm* — David D. Brush; Westman, Champlin & Koehler, P.A.

(57) ABSTRACT

A method for encoding a data stream representing an omnidirectional video. The method includes: encoding, in the stream, at least one base layer representative of a 2D or 3D video, the 2D or 3D video being representative of a view of a same scene captured by the omnidirectional video; and encoding, in the stream, one enhancement layer representative of the omnidirectional video. The enhancement layer is encoded by prediction relative to the base layer. The prediction of the enhancement layer relative to the base layer includes: generating a reference sub-image obtained by geometrical projection on the reference sub-image of an image, called a base image, rebuilt from the base layer, and storing the reference sub-image in association with shift information enabling an encoder to determine the location of the reference sub-image in the enhancement image in a non-transitory computer-readable memory of reference sub-images of the enhancement layer.

14 Claims, 10 Drawing Sheets

Figures 1A, 1B:
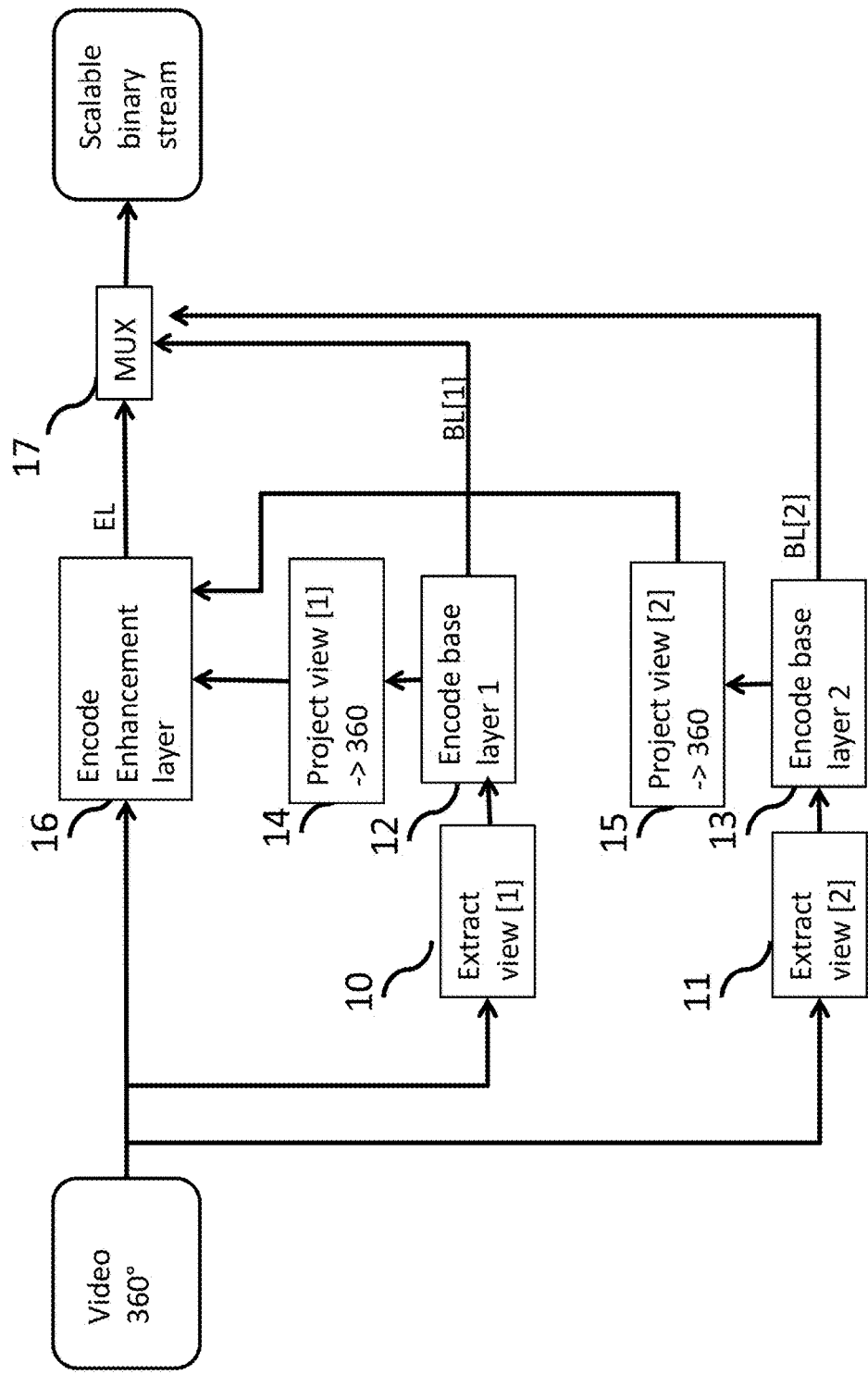

(51) Int. Cl.
*H04N 19/34* (2014.01)
*H04N 19/103* (2014.01)
*H04N 19/105* (2014.01)
*H04N 19/172* (2014.01)
*H04N 19/187* (2014.01)
*H04N 19/30* (2014.01)
*H04N 19/46* (2014.01)
*H04N 19/61* (2014.01)
*H04N 19/70* (2014.01)
*H04N 19/176* (2014.01)

(56) References Cited

U.S. PATENT DOCUMENTS

| | | |
|---|---|---|
| 2008/0267289 A1 | 10/2008 | Yu et al. |
| 2011/0012994 A1 | 1/2011 | Park et al. |
| 2012/0213275 A1 | 8/2012 | Kwon et al. |
| 2014/0064364 A1 | 3/2014 | Wang et al. |
| 2014/0098880 A1 | 4/2014 | Seregin et al. |
| 2015/0256838 A1 | 9/2015 | Deshpande |
| 2015/0281708 A1 | 10/2015 | Chuang et al. |
| 2016/0014425 A1 | 1/2016 | Hinz et al. |
| 2016/0037178 A1 | 2/2016 | Lee et al. |
| 2016/0156917 A1 | 6/2016 | Ugur et al. |
| 2016/0165244 A1 | 6/2016 | Bordes et al. |
| 2017/0238011 A1 | 8/2017 | Pettersson et al. |
| 2018/0041764 A1* | 2/2018 | Lin ............ H04N 5/23238 |
| 2018/0376126 A1* | 12/2018 | Hannuksela ...... H04N 13/161 |
| 2019/0349598 A1 | 11/2019 | Aminlou et al. |

FOREIGN PATENT DOCUMENTS

| | | |
|---|---|---|
| CN | 105659600 A | 6/2016 |
| JP | 2015035641 A | 2/2015 |
| WO | 2015048176 A1 | 4/2015 |
| WO | 2016108188 A1 | 7/2016 |
| WO | 2016185090 A1 | 11/2016 |
| WO | 2018045108 A1 | 3/2018 |

OTHER PUBLICATIONS

Y-K Wang (Qualcomm): "On ERP Equations for Sample Location Remapping and Sphere Coverage Signalling" 29. JCT-VC Meeting; Oct. 23, 2017, Oct. 27, 2017; Macau; (Joint Collaborative Team on Video Coding of ISO/IEC JTC1/SC29/WG11 and ITU-T SG.16); URL: Http://WFTP3.ITU.INT/AV-arch/JCTVC-Site/,, No. JCTVC-AC0024-v6, Oct. 10, 2017 (Oct. 10, 2017), XP030118298.

"Algorithm Descriptions of Projection Format Conversion and Video Quality Metrics in 360Lib Version 4", 119. MPEG Meeting; Jul. 17, 2017-Jul. 21, 2017; Torino; (Motion Picture Expert Group or ISO/IEC JTC1/SC29/WG11),, No. N17056, Oct. 1, 2017 (Oct. 1, 2017), XP030023717.

H-M Oh et al., "Omnidirectional Fisheye Video SEI message", 29. JCT-VC Meeting; Oct. 23, 2017-Oct. 27, 2017; Macu; (Joint Collaborative Team on Video Coding of ISO/IEC JTC1/SC29/WG11 and ITU-T SG.16); URL: Http://WFTP3.ITU.INT/AV-Arch/JCTVC-Site/,, No. JCTVC-AC0034 Oct. 11, 2017 (Oct. 11, 2017), XP030118311.

Kashyap Kammachi-Sreedhar et al., "Standard-compliant Multiview Video Coding and Streaming for Virtual Reality Applications", 2016 IEEE International Symposium on Multimedia.

English translation of Written Opinion of the International Searching Authority dated Dec. 13, 2018 for corresponding International Application No. PCT/EP2018/077922, filed Oct. 12, 2018.

Office Action dated Sep. 25, 2020 from the United States Patent and Trademark Office for U.S. Appl. No. 16/756,755, filed Apr. 16, 2020.

Final Office Action dated Apr. 1, 2021 from the United States Patent and Trademark Office for U.S. Appl. No. 16/756,755, filed Apr. 16, 2020.

Notice of Allowance dated Jul. 14, 2021 from the United States Patent and Trademark Office for U.S. Appl. No. 16/756,755, filed Apr. 16, 2020.

Chinese Office Action, including Search Report, dated Dec. 19, 2022 for parallel Chinese Application No. 201880068327.9.

Boyce, J. M. et al., "Overview of SHVC: Scalable Extensions of the High Efficiency Video Coding Standard", IEEE Transactions on Circuits and Systems for Video Technology, vol. 26, No. 1, Jan. 2016.

Sun, W. et al., "Test Sequences for Virtual Reality Video Coding from LetinVR", Joint Video Exploration Team (JVET), of ITU-T SG 16 WP 3 and ISO/IEC JTC 1/SC 29/WG 11, 4th Meeting: Chengdu, CN, Oct. 15-21, 2016, Document: JVET-D0179.

* cited by examiner

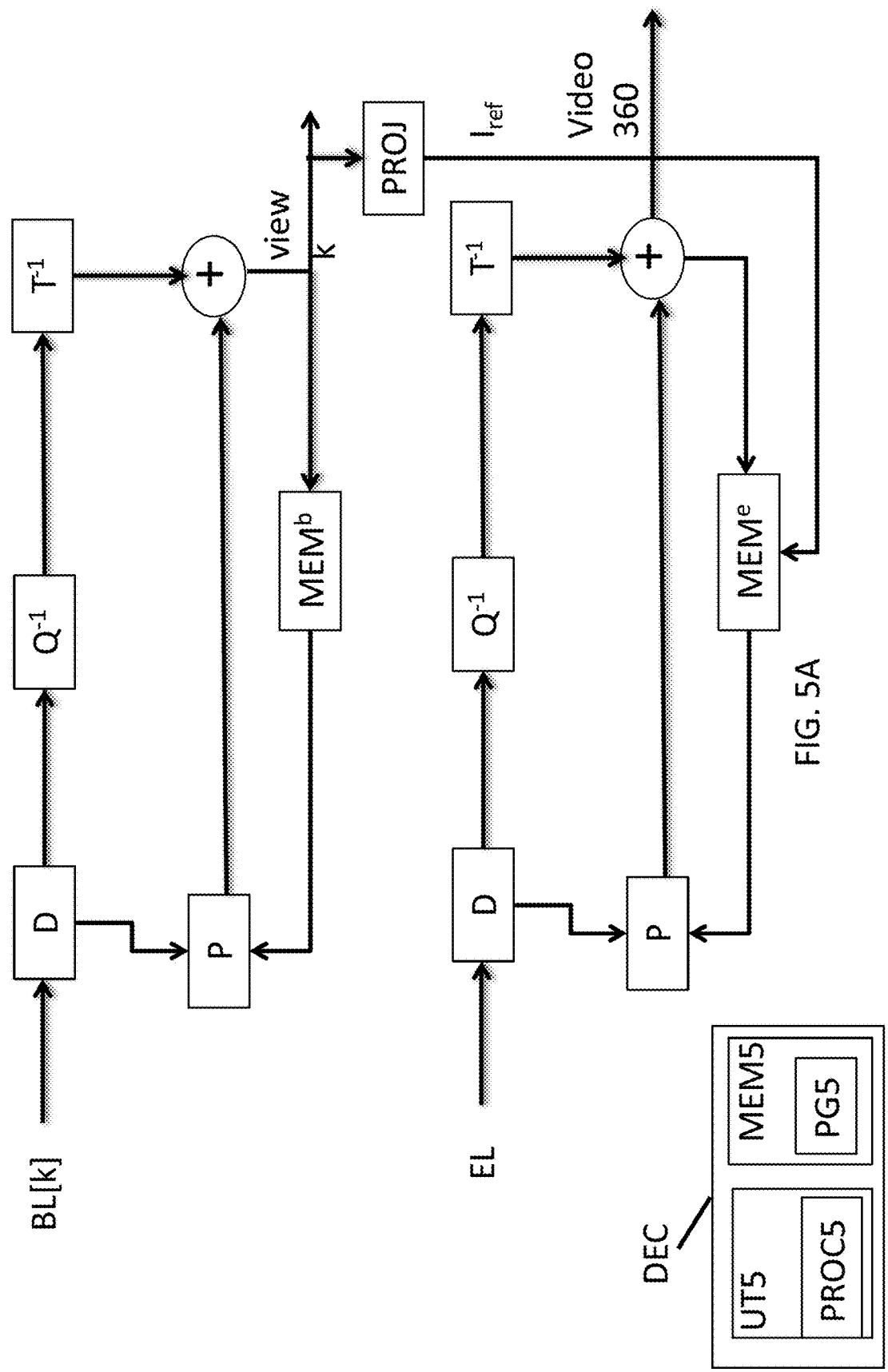

METHODS FOR ENCODING DECODING OF A DATA FLOW REPRESENTING OF AN OMNIDIRECTIONAL VIDEO

1. CROSS-REFERENCE TO RELATED APPLICATIONS

This application is a Continuation application of U.S. Ser. No. 16/756,755, filed on Apr. 16, 2020, which is a Section 371 National Stage application of International Application No. PCT/EP2018/077922, filed Oct. 12, 2018, the contents of which are hereby incorporated by reference in their entireties.

2. FIELD OF THE INVENTION

The invention is situated in the field of video compression, and more particularly that of techniques for encoding and decoding immersive or omnidirectional (e.g. 180°, 360° in 2D or 3D) video.

3. PRIOR ART

An omnidirectional video can be used to represent a scene from a central point and to do so in every direction. The term "360° video content" is used when the totality of the field is used. A subset of the field can also be captured, for example covering only 180°. The content can be captured monoscopically (2D) or stereoscopically (3D). This type of content can be generated by assembling sequences of images captured by different cameras or else it can be generated synthetically by computer (e.g. in VR video games). The images of such a video content enable the rendering, via an appropriate device, of the video along any direction whatsoever. A user can control the direction in which the captured scene is displayed and navigates continuously in every possible direction.

Such 360° video contents can for example be rendered by using a virtual reality helmet offering the user an impression of immersion in the scene captured by the 360° video content.

Such 360° video contents necessitate reception devices adapted to this type of content (a virtual reality helmet for example) in order to offer the functions of immersion and control of the displayed view by the user.

However most currently used video content receivers are not compatible with this type of 360° video content and enable the rendering of only classic 2D or 3D video contents. Indeed, the rendering of a 360° video content necessitates the application of geometrical transforms to the images of the video in order to render the desired viewing direction.

Thus the broadcasting of 360° video contents is not backwards-compatible with the existing fleet of video receivers and is limited solely to receivers adapted to contents of this type.

However it is observed that the content captured specifically for a 360° video broadcast can have been already captured for a 2D or 3D video broadcast. In this case, it is the totality of the 360° content projected on a plane that is broadcast.

In addition, the simultaneous broadcasting of a same content captured in different formats (2D or 3D and 360°) to address the different video receivers is costly in terms of bandwidth, since it is necessary to send as many video streams as there are possible formats, namely 2D, 3D, 360° views of the same captured scene.

There is therefore a need to optimize the encoding and the broadcasting of omnidirectional video contents, representative of a part (180°) of a scene or the totality (360°) of a scene and to do so monoscopically (2D) or stereoscopically (3D).

There are techniques of video encoding by layers, known as scalable video encoding, used to encode a 2D video stream in several successive layers of refinements offering different levels of rebuilding of the 2D video. For example, spatial scalability enables the encoding of a video signal in several layers of increasing spatial resolution. Scalability in terms of PSNR (Peak Signal to Noise Ratio) enables the encoding of a video signal for a fixed spatial resolution in several layers of rising quality. Scalability in the colorimetric space enables the encoding of a video signal in several layers represented in increasingly wider colorimetric spaces.

However, none of the existing techniques enables the generation of a video data stream representative of a scene that can be decoded by a classic 2D or 3D video decoder as well as by a 360° video decoder.

The US document 2016/156917 describes a method for the scalable encoding of a video that can be a multiview video and wherein each view of the multiview video is encoded in a layer of the stream and predicted by another view of the multiview video.

4. SUMMARY OF THE INVENTION

The invention improves on the prior art. To this effect, it concerns a method for encoding a data stream representative of an omnidirectional video, comprising:
  the encoding in said stream of at least one base layer representative of a 2D or 3D video, the 2D or 3D video being representative of a view of a same scene captured by the omnidirectional video (360°, 180° etc),
  the encoding in said stream of at least one enhancement layer representative of the omnidirectional video, the at least one enhancement layer being encoded by prediction relative to the at least one base layer.

The invention thus reduces the cost of transmission of the video streams when the video contents must be transmitted in 2D view as well as in 360° view or in 3D view and in 3D-360° view. Thus, a classic 2D or 3D video decoder will decode only the base layer or one of the base layers to rebuild a 2D or 3D video of the scene and a compatible 360° decoder will decode the base layer or layers and at least one enhancement layer to rebuild the 360° video. The use of a prediction of the at least one base layer to encode the enhancement layer thus reduces the cost of encoding the enhancement layer.

Correlatively, the invention also concerns a method for decoding a data stream representative of an omnidirectional video, comprising:
  the decoding, from said stream, of at least one base layer representative of a 2D or 3D video, the 2D or 3D video being representative of a view of a same scene captured by the omnidirectional video,
  the decoding, from said stream, of at least one enhancement layer representative of the omnidirectional video, the at least one enhancement layer being decoded by prediction relative to the at least one base layer.

The term "omnidirectional video" herein is understood to mean equally well a video of a scene, for which the totality of the field (360°) is captured and a video of a scene for which a sub-part of the 360° field is captured, for example 180°, 160°, 255.6°, or the like. The omnidirectional video is therefore representative of a scene captured on at least one continuous part of the 360° field.

According to one particular embodiment of the invention, the prediction of the enhancement layer relative to the at least one base layer comprises, in order to encode or rebuild at least one image of the enhancement layer:
- the generating of a reference image obtained by geometrical projection on the reference image of an image, called a base image, rebuilt from the at least one base layer,
- the storing of said reference image in a memory of reference images of the enhancement layer.

Advantageously, the prediction in the enhancement layer is carried out by the addition, during the encoding or decoding of an image of the enhancement layer, of a reference image in which the images rebuilt from base layers are projected. Thus, a new reference image is added into the memory of reference images of the enhancement layer. This new reference image is generated by geometrical projection of all the base images rebuilt from the base layers at a time instant.

According to another particular embodiment of the invention, the data stream comprises a piece of information representative of a type of geometrical projection used to represent the omnidirectional video.

According to another particular embodiment of the invention, the view presented by the 2D or 3D video is a view extracted from the omnidirectional video.

According to another particular embodiment of the invention, the data stream comprises a piece of information representative of a type of geometrical projection used to extract a view of the omnidirectional video and of its parameters of location.

According to one variant, such a piece of information representative of parameters of projection and of location of said base image is encoded in the data stream in each image of the 360° video. Advantageously, this variant is used to take account of a shift in the scene of a view serving as a prediction for the enhancement layer. For example, the images of the video of the base layer can correspond to images captured while moving in the scene, for example to track an object in motion in the scene. For example, the view can be captured by a camera in motion or successively by several cameras located at different viewpoints in the scene, to track a ball or a player during a football match for example.

According to another particular embodiment of the invention, the data stream comprises at least two base layers, each base layer being representative of a 2D or 3D video, each base layer being respectively represented by a view of the scene, the at least two base layers being encoded independently of each other.

Thus, it is possible to have several independent base layers in the stream enabling several 2D or 3D views of the 360° video to be rebuilt independently.

According to another particular embodiment of the invention, an image of the enhancement layer is encoded by means of a group of tiles, each tile covering a region of the image of the enhancement layer, each region being distinct and separated from the other regions of the image of the enhancement layer, each tile being encoded by prediction relative to the at least one base layer. The decoding of the enhancement layer comprises the rebuilding of a part of the image of the enhancement layer, the rebuilding of said part of the image comprising the decoding of the tiles of the enhancement layer covering the part of the image of the enhancement layer to be rebuilt, and the decoding of the at least one base layer comprising the decoding of the base layers used to predict the tiles covering the part of the image of the enhancement layer to be rebuilt.

Such a particular embodiment of the invention enables the rebuilding of only one part of the omnidirectional image and not the entire image. Typically, only the part being viewed by the user is rebuilt. Thus, it is not necessary to decode all the base layers of the video stream or even send them to the receiver. Indeed, with a user being unable to simultaneously see the entire image of the omnidirectional video, it is possible to encode an omnidirectional image by a tile mechanism enabling the independent encoding of the regions of the omnidirectional image so as to then make it possible to decode only those regions of the omnidirectional image that are visible to the user.

Through the particular embodiment of the invention, the independent encoding of the base layers thus makes it possible to rebuild the tiles of the omnidirectional image separately and to limit the complexity when decoding by avoiding the decoding of unnecessary base layers.

Advantageously, for each tile of the enhancement layer to be decoded, a piece of information identifying the at least one base layer used to predict the tile is decoded from the data stream.

The invention also relates to a device for encoding a data stream representative of an omnidirectional video. The encoding device comprises means of encoding in said stream of at least one base layer representative of a 2D or 3D video, the 2D or 3D video being representative of a view of a same scene captured by the omnidirectional video, and means of encoding, in said stream, at least one enhancement layer representative of the omnidirectional video, said means of encoding the enhancement layer comprising means of prediction of the enhancement layer relative to the at least one base layer.

The invention also relates to a device for decoding a data stream representative of an omnidirectional video. The decoding device comprises means for the decoding, in said stream, of at least one base layer representative of a 2D or 3D video, the 2D or 3D video being representative of a view of a same scene captured by the omnidirectional video, and means of decoding, in said stream, at least one enhancement layer representative of the omnidirectional video, said means for decoding the enhancement layer comprising means of prediction of the enhancement layer representative to the at least one base layer.

The encoding device and decoding device respectively are especially adapted to implementing the method of encoding and decoding respectively described here above. The encoding device and decoding device respectively could of course comprise the different characteristics of the encoding method and decoding method respectively, according to the invention. Thus, the characteristics and advantages of this encoding and decoding device respectively are the same as those of the encoding and decoding method respectively and are not described in more ample detail.

According to one particular embodiment of the invention, the decoding device is comprised in a terminal.

The invention also relates to a signal representative of an omnidirectional video comprising encoded data of at least one base layer representative of a 2D or 3D video, the 2D or 3D video being representative of a view of a same scene captured by the omnidirectional video and encoded data of at least one enhancement layer representative of the omnidirectional video, the at least one enhancement layer being encoded by prediction relative to the at least one base layer.

According to one particular embodiment of the invention, an image of the enhancement layer is encoded by means of a group of tiles, each tile covering a region of the image of the enhancement layer, each region being distinct and separated from the other regions of the image of the enhancement layer, each tile being encoded by prediction relative to the at least one base layer. According to one particular embodiment of the invention, the signal also comprises for each tile a piece of information identifying the at least one base layer used to predict the tile. Thus, only the base layers needed for decoding a tile to be decoded are decoded, thus optimizing the use of the resources of the decoder.

The invention also relates to a computer program comprising instructions to implement the method of encoding or the method of decoding according to any one of the particular embodiments described here above when said program is executed by a processor. Such a program can use any programming language whatsoever. It can be downloaded from a communications network and/or recorded on a medium readable by computer. This program can use any programming language whatsoever and be in the form of source code, object code or intermediate code between source code and object code, such as in a partially compiled form or in any other desirable form whatsoever.

According to yet another aspect, the invention concerns a recording support or medium or information support or medium readable by a computer, comprising instructions of a computer program such as is mentioned here above. The recording media mentioned here above can be any entity or device capable of storing the program. For example, the medium can comprise a storage means such as a read-only memory (ROM) type memory, for example a CD-ROM or a microelectronic circuit ROM, a flash memory mounted on a detachable storage medium, such as a USB stick, or again a magnetic mass memory of the hard-disk drive (HDD) or solid-state drive (SSD) type or a combination of memories working according to one or more data-recording technologies. Furthermore, the recording medium can correspond to a transmissible medium such as an electrical or optical signal that can be conveyed via an electrical or optical cable, by radio or by other means. In particular, the proposed computer program can be downloaded from an Internet type network.

As an alternative, the recording medium can correspond to an integrated circuit into which the program is incorporated, the circuit being adapted to the execution of a use in the execution of the method in question.

The encoding or decoding method according to the invention can therefore be implemented in various ways, especially in wired form or in software form.

5. LIST OF FIGURES

Figure 2A:
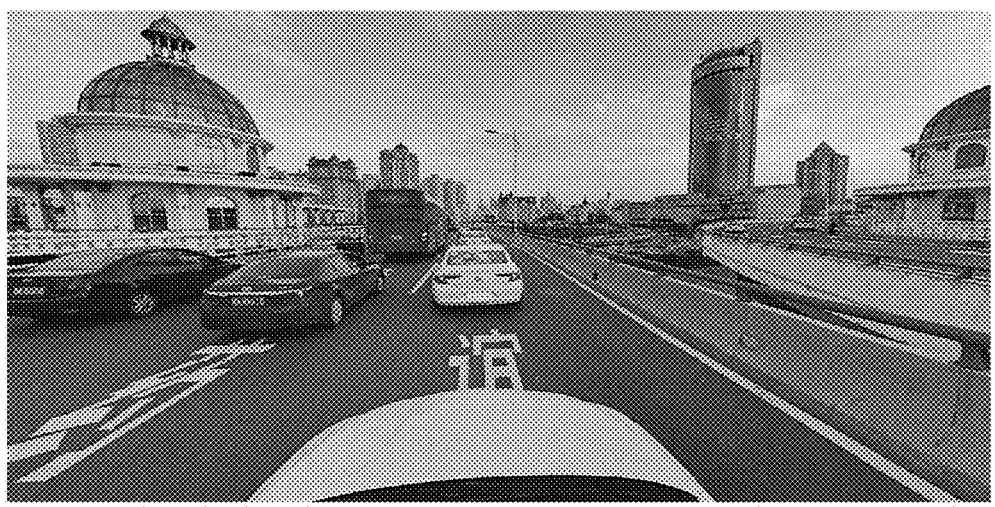
Figure 2B:
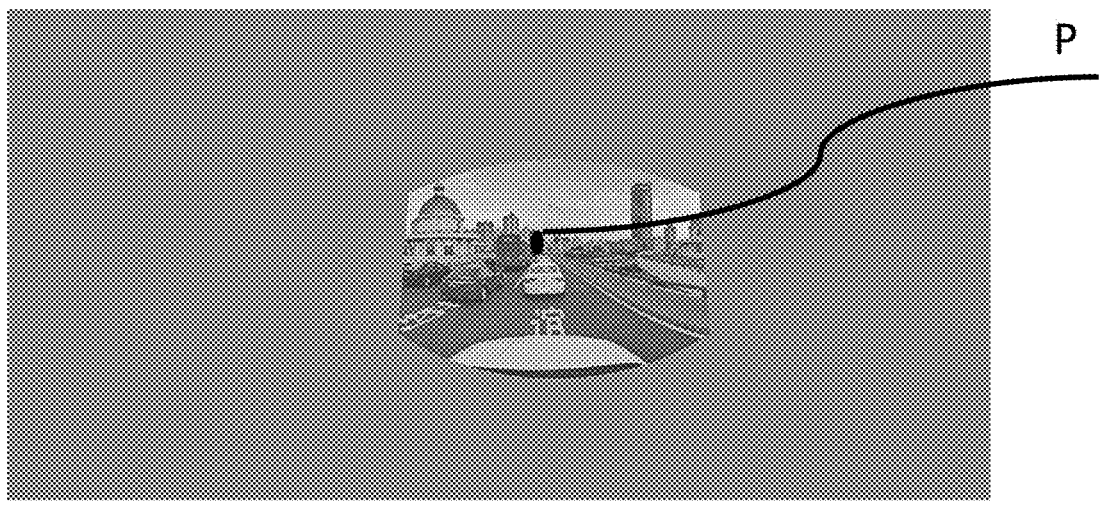
Figure 2C:
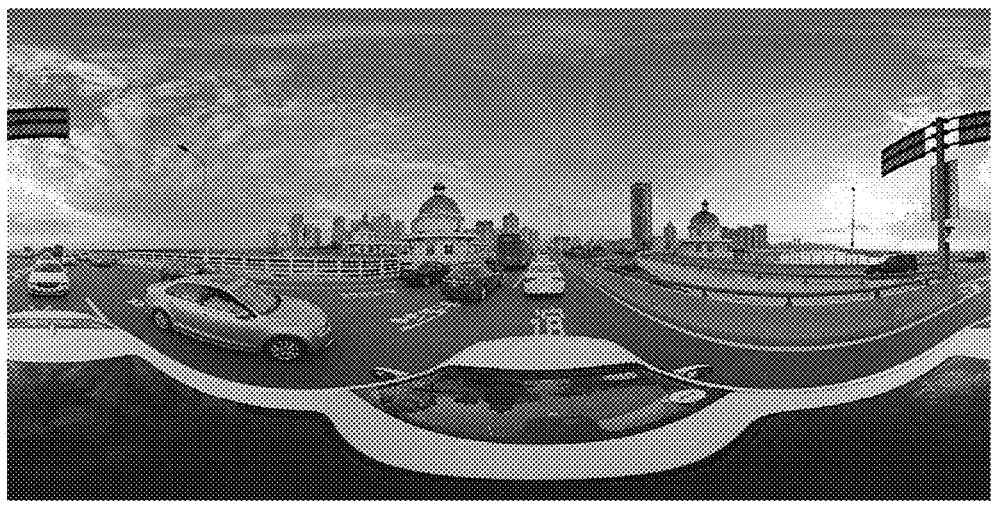
Figure 2D:
Figure 2E:
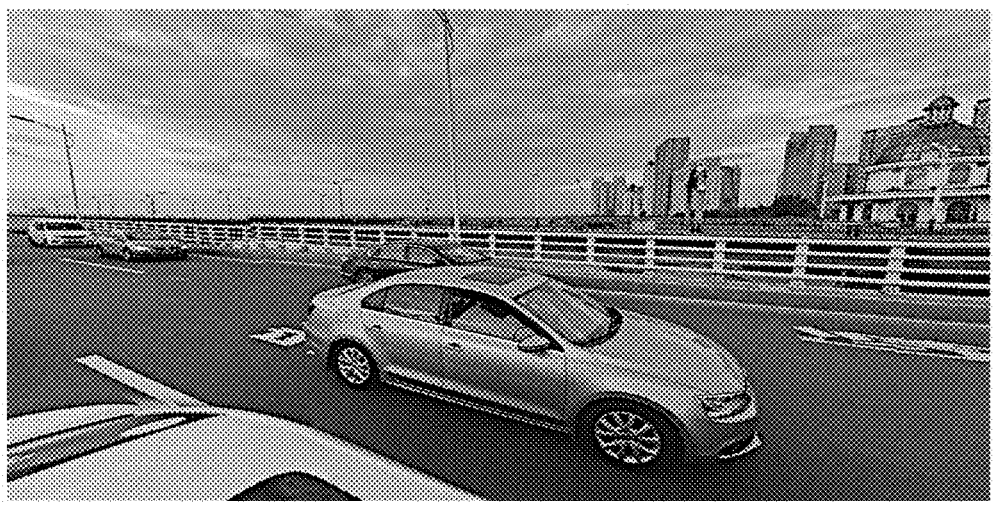
Figure 2F:
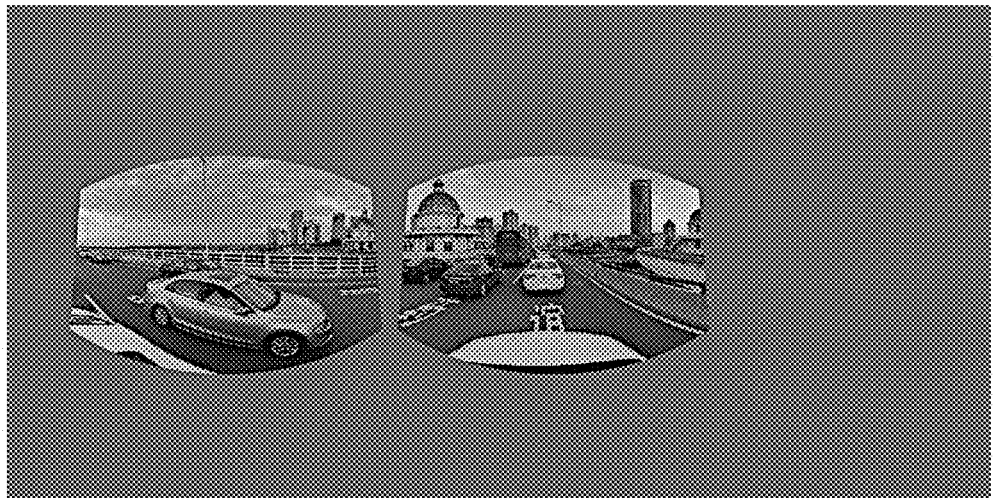
Figure 2G:
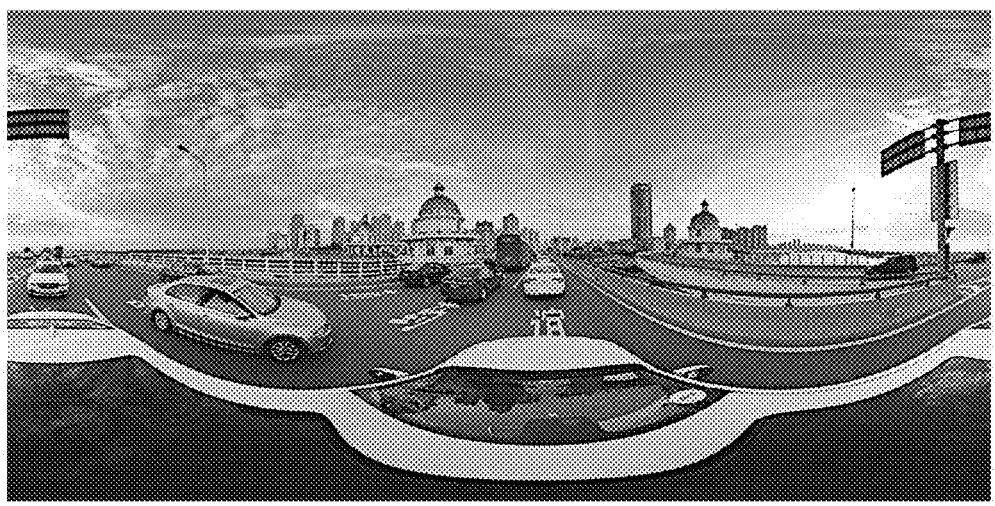
Figure 6A:
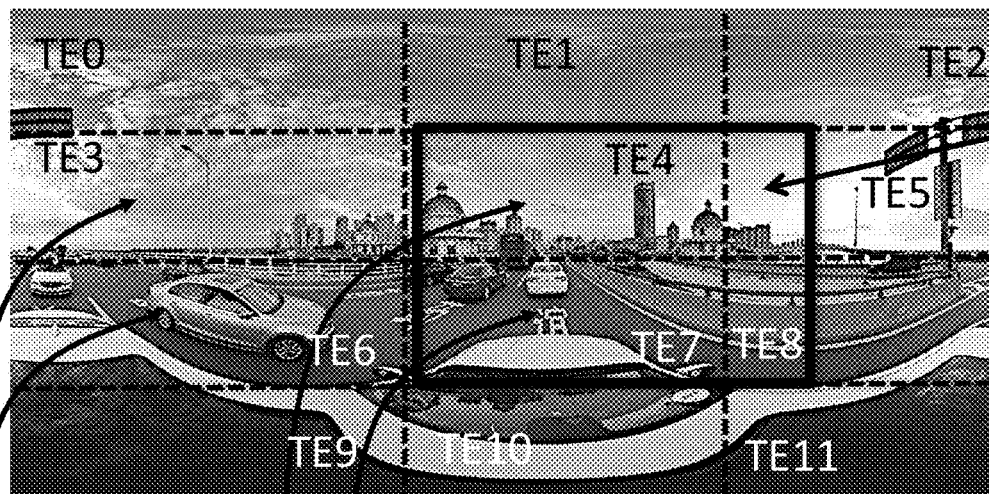
Figure 6B:
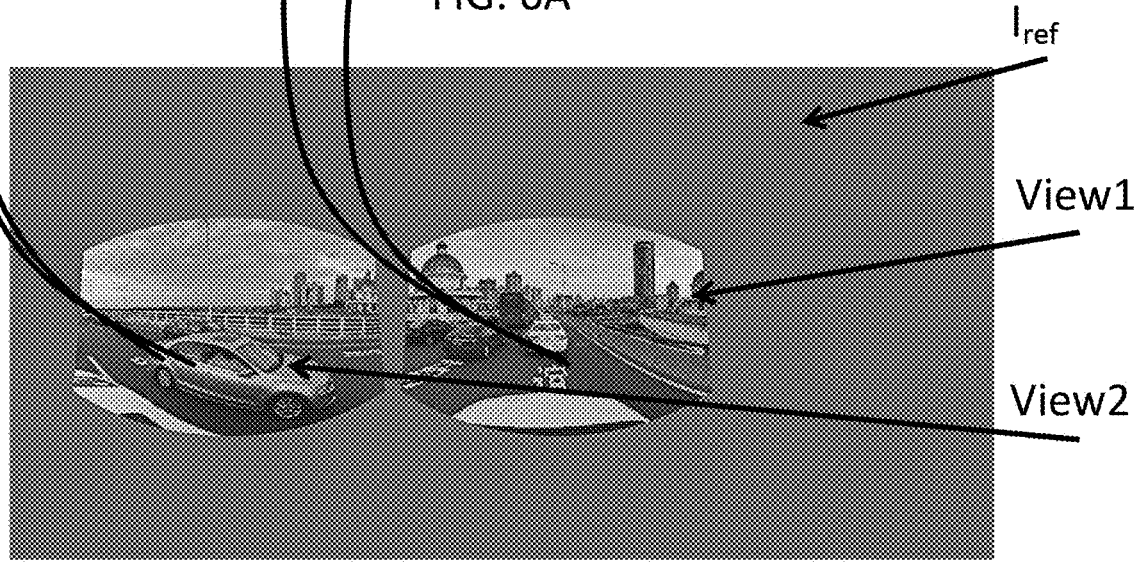
Figure 3:
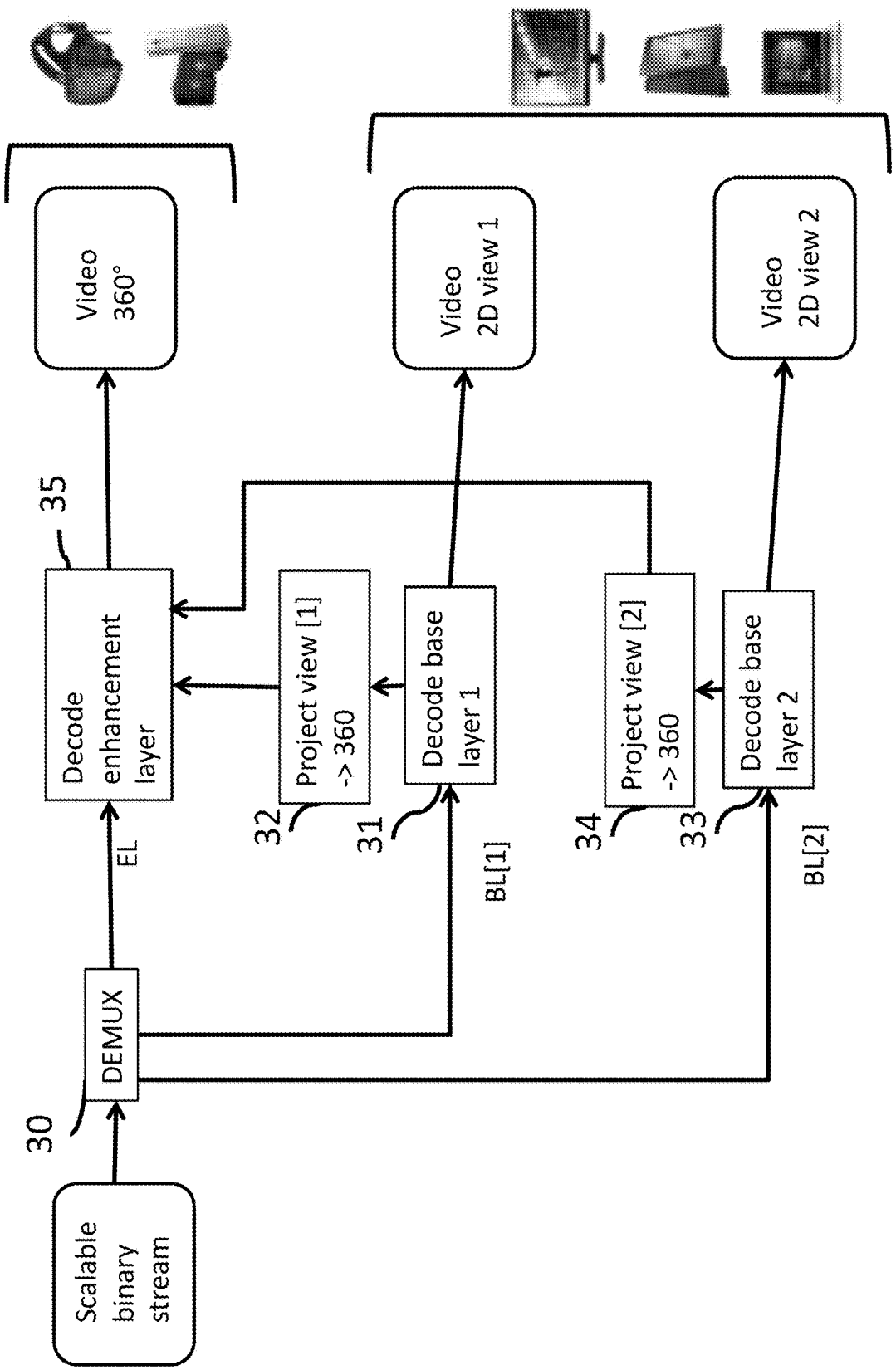
Figures 4A, 4B:
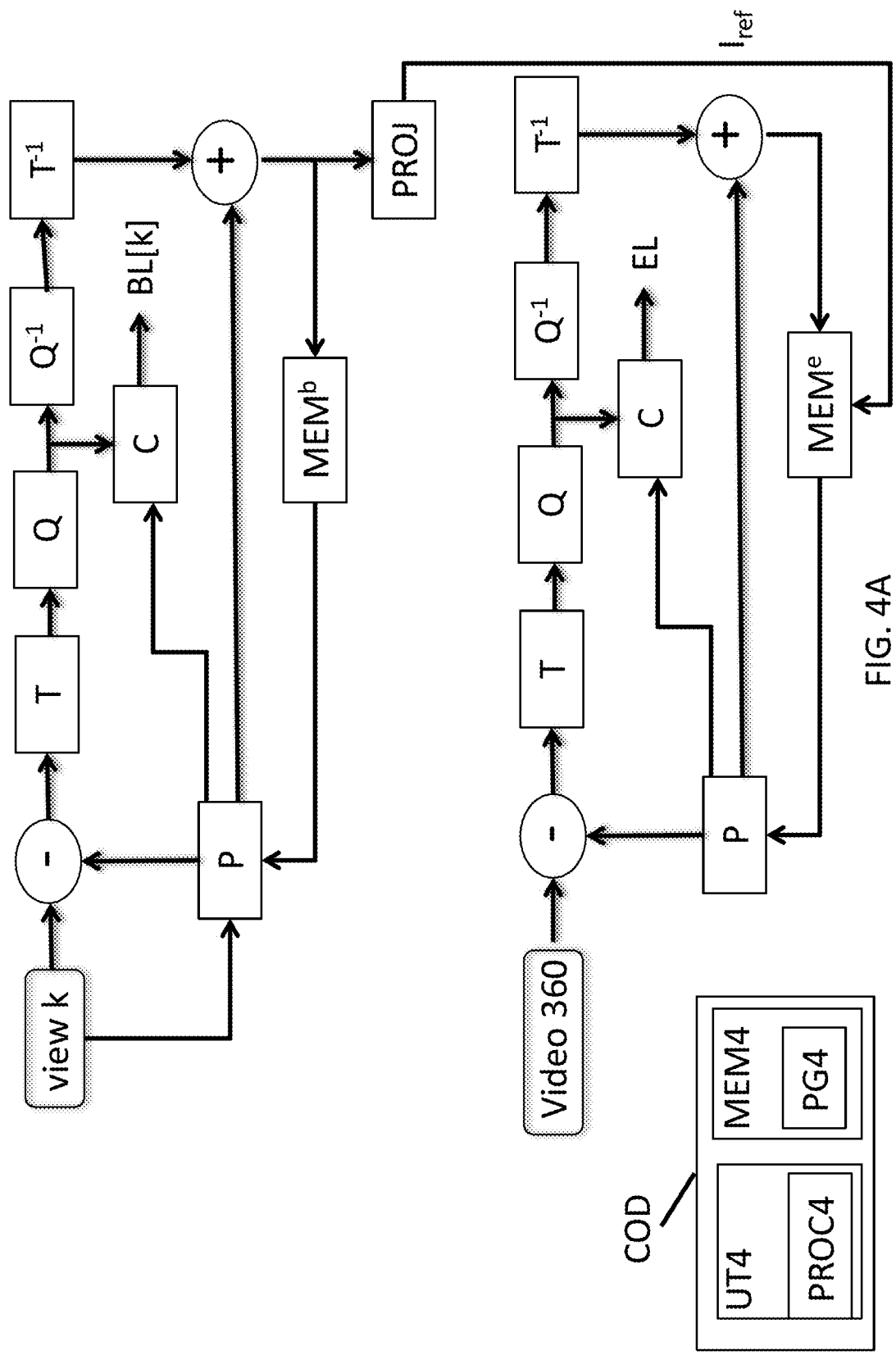
Figure 7C:
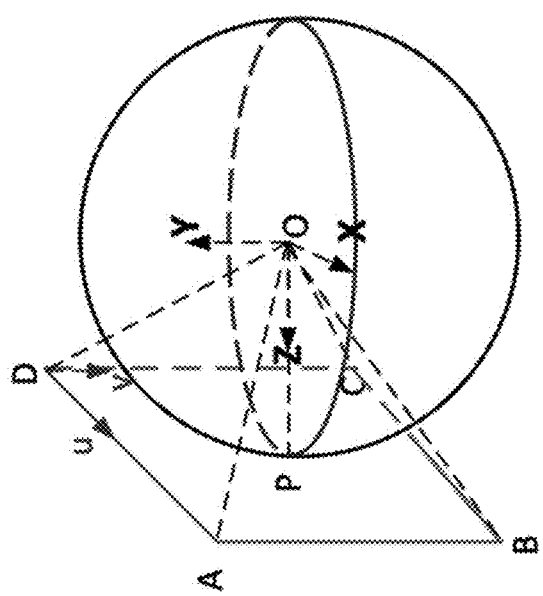
Figure 7B:
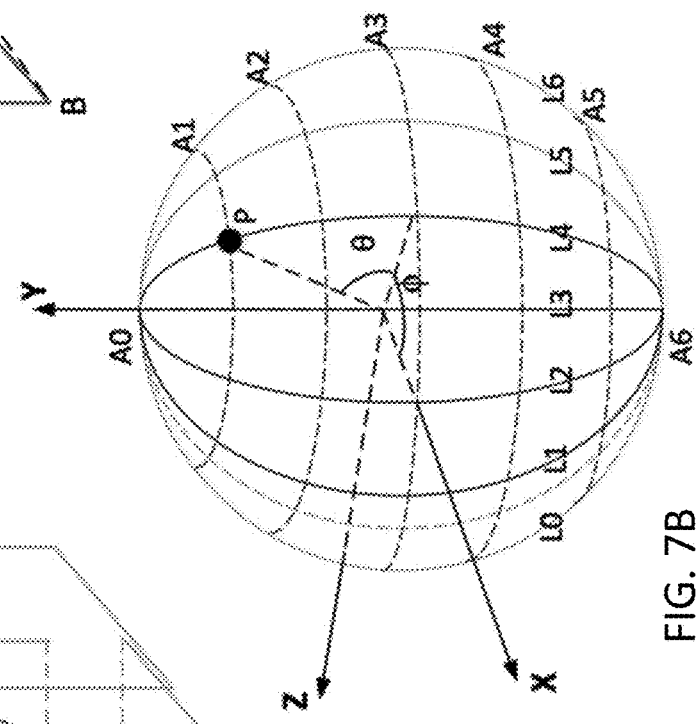
Figure 7A:
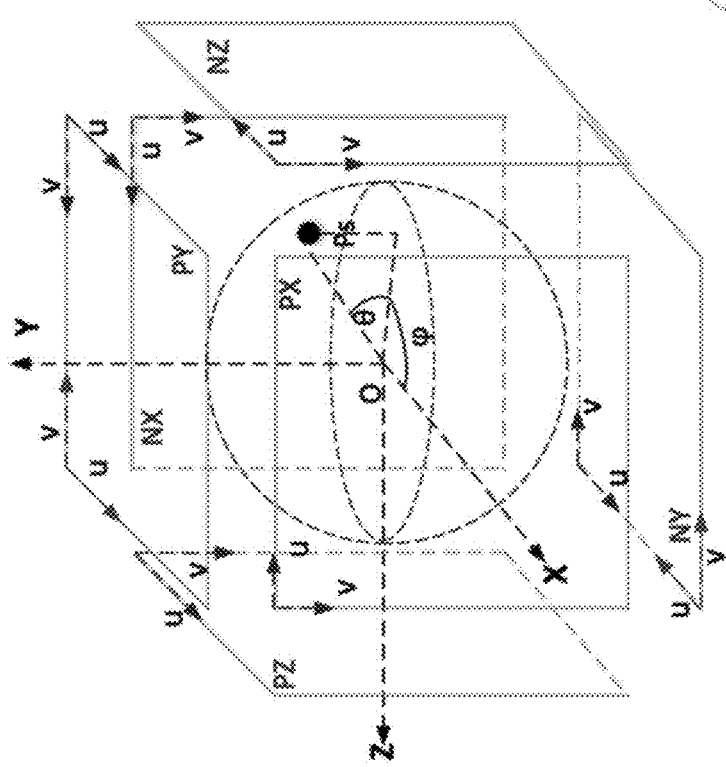
Figure 7D:
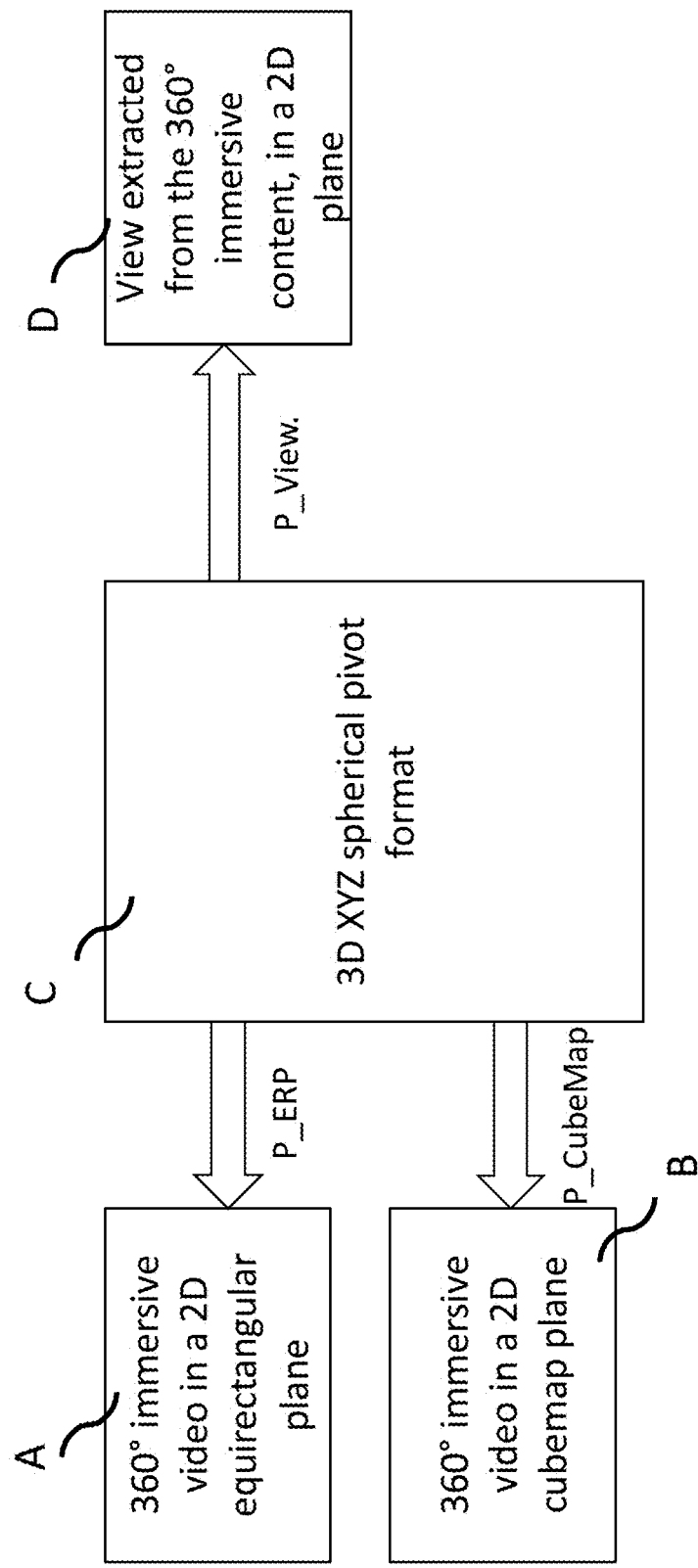
Figure 8:
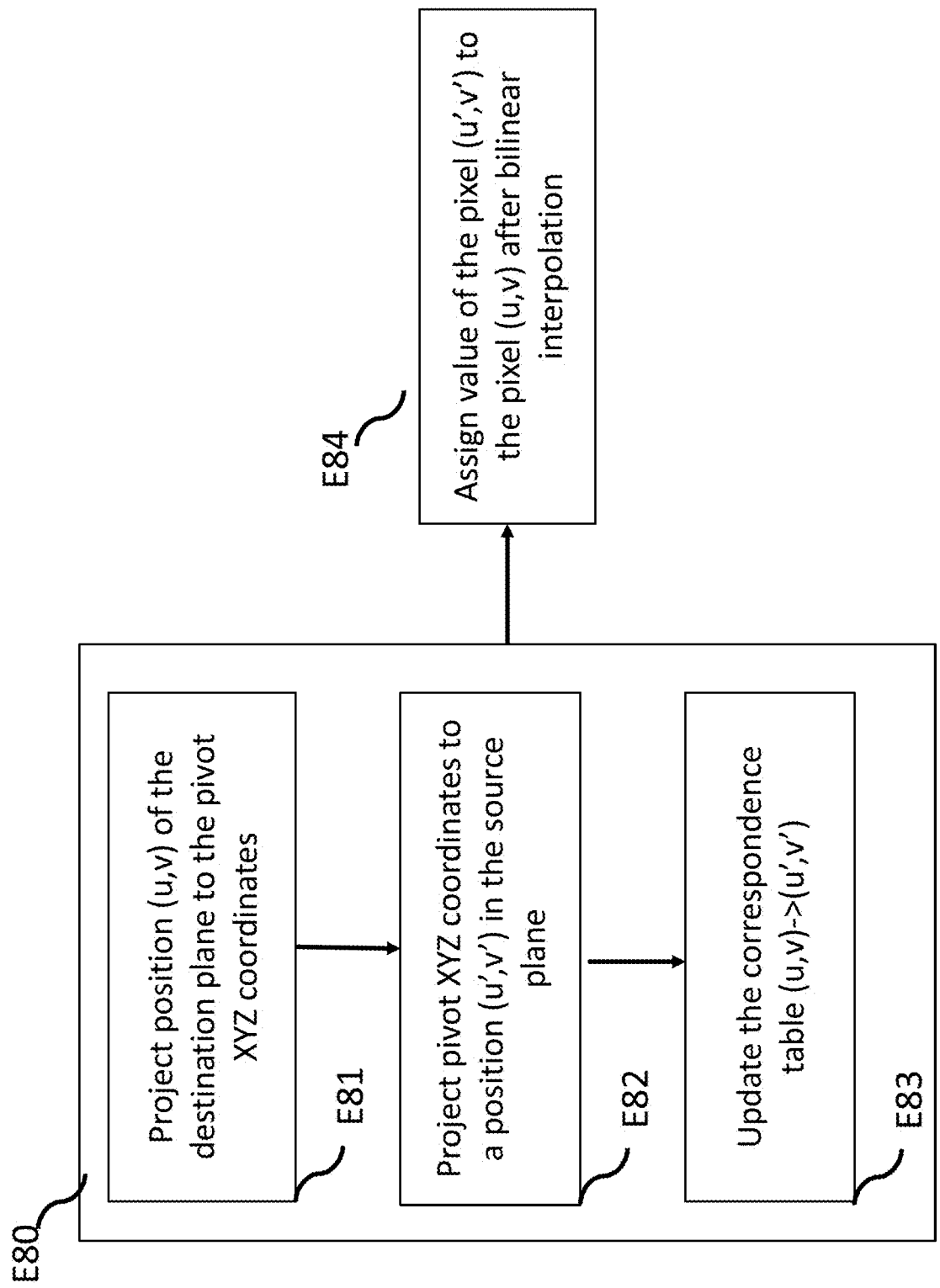

Other features and advantages of the invention shall appear more clearly from the following description of one particular embodiment, given by way of a simple illustratory and non-exhaustive example and from the appended drawings, of which:

FIG. 1A illustrates the steps of the method of encoding according to one particular embodiment of the invention, FIG. 1B illustrates an example of a signal generated according to the method of encoding implemented according to one particular embodiment of the invention, FIG. 2A illustrates an image of a view of a scene captured by a 360° video encoded in a base layer, FIG. 2B illustrates the image illustrated in FIG. 2A projected in the referential of an image of the 360° video, FIG. 2C illustrates an image of the 360° video encoded in an enhancement layer, FIGS. 2D and 2E each illustrate an image of two views of a scene captured by a 360° video and each encoded in a base layer, FIG. 2F illustrates the images of two views illustrated in FIGS. 2D and 2E projected in the referential of an image of the 360° video, FIG. 2G illustrates an image of the 360° video encoded in an enhancement layer, FIG. 3 illustrates steps of the method of decoding according to one particular embodiment of the invention, FIG. 4A illustrates an example of an encoder configured to implement the method of encoding according to one particular embodiment of the invention, FIG. 4B illustrates a device adapted to implementing the method of encoding according to another particular embodiment of the invention, FIG. 5A illustrates an example of a decoder configured to implement the method of decoding according to one particular embodiment of the invention, FIG. 5B illustrates a device adapted to implementing the method of decoding according to another particular embodiment of the invention, FIGS. 6A and 6B respectively illustrate an image of the 360° omnidirectional video encoded by independent tiles and a reference image generated from two views of two base layers and used to encode the image of FIG. 6A, FIGS. 7A-C respectively illustrate a projection in a 2D plane of a 360° omnidirectional video with cubemap type projection, a 3D spherical representation in an XYZ referential of the 360° omnidirectional video and a view extracted from the 360° immersive content in a 2D plane according to a rectilinear projection, FIG. 7D illustrates the relationship between different geometrical projections, FIG. 8 illustrates the procedure for building the reference image.

The images of FIGS. 2A, C-E and G and of FIGS. 7A-B are extracted from 360° videos made available by LetInVR within the framework of the JVET (Joint Video Exploration Team), JVT-D0179: *Test Sequences for Virtual Reality Video Coding from Letin VR,* 15-21 Oct. 2016).

6. DESCRIPTION OF ONE EMBODIMENT OF THE INVENTION 6.1 General Principle

The general principle of the invention is that of encoding a data stream scalably, thus making it possible to rebuild and render a 360° video when a receiver is adapted to receiving and rendering such a 360° video and rebuilding and rendering a 2D or 3D video when the receiver is adapted only to rendering a 2D or 3D video.

In order to reduce the cost of transmission of a stream comprising the 2D or 3D video as well as the 360° video, according to the invention, the 2D or 3D video is encoded in a base layer and the 360° video is encoded in an enhancement or improvement layer predicted from the base layer.

According to one particular embodiment of the invention, the stream can comprise several base layers each corresponding to a 2D or 3D video corresponding to a view of the scene. The enhancement layer is thus encoded by prediction on the basis of all or a part of the base layers comprised in the stream.

6.2 Examples of Implementation

FIG. 1A illustrates steps of the method of encoding according to one particular embodiment of the invention. According to this particular embodiment of the invention, a 360° video is encoded scalably by extracting views from a 360° video and by encoding each view in a base layer. The term "view" is understood here to mean a sequence of images acquired from a viewpoint of the scene captured by the 360° video. Such a sequence of images can be a sequence of monoscopic images in the case of a 360° video in 2D or a sequence of stereoscopic images in the case of a 360° video in 3D. In the case of a sequence of stereoscopic images, each image comprises a left-hand view and a right-hand view encoded jointly for example in the form of an image generated by means of left-hand and right-hand views placed side by side or one above the other. The encoder encoding such a sequence of stereoscopic images in a base layer or an enhancement layer will then encode each image comprising a left-hand view and a right-hand view as a classic sequence of 2D images.

Here below, we describe an embodiment in which the omnidirectional video is a 360° video in 2D.

Here we describe an embodiment where two base layers are used to encode the enhancement layer. Generally, the method described here applies to the case where a number of views N, with N greater than or equal to 1, is used for the encoding of the enhancement layer.

The number of base layers is independent of the number of views used to generate the 360° video. The number of base layers encoded in the scalable data stream is for example determined during the production of the content or it can be determined by the encoder for purposes of optimizing the bit rate.

During the steps 10 and 11, a first and a second view are extracted from the 360° video. The views [1] and [2] are respectively encoded during an encoding step 12 for encoding a base layer BL[1] an encoding step 13 for encoding a base layer BL[2].

In one particular embodiment described here, the base layers BL[1] and BL[2] are encoded independently of one another, i.e. there is no dependence of encoding (prediction, encoding context, etc.) between the encoding of the images of the base layer BL[1] and the encoding of the images of the base layer BL[2]. Each base layer BL[1] or BL[2] is decodable independently of the others. According to another particular embodiment, it is possible to encode the base layers BL[1] and BL[2] dependently, for example to gain in compression efficiency. However, this particular embodiment of the invention requires that the decoder should be capable of decoding both base layers to render a classic 2D video.

Each encoded/rebuilt image of the base layers BL[1] and BL[2] is then projected (steps 14 and 15 respectively) geometrically onto a same reference image $I_{ref}$. The result of this is a partially filled reference image that contains the samples interpolated from the projected view or views of the base layer. The building of the reference image is described in greater detail with reference to FIG. 8.

FIGS. 2A-2C illustrate one embodiment in which a single base layer is used. According to this embodiment, the images of the 360° video have a spatial resolution of 3840×1920 pixels and are generated by an equirectangular projection and the 360° image sequence has a frequency of 30 images per second. FIG. 2C illustrates an image of the 360° video at a time instant t encoded in the enhancement layer.

An image at the time instant t of the view extracted from the 360° video is illustrated in FIG. 2A. Such a view is for example extracted from the 360° video by means of the following coordinates: yaw=20°, pitch=5°, horizontal FOV (field of view)=110° and vertical FOV=80°, the spatial resolution of the images of the extracted view is 1920×960 pixels and the time frequency is 30 images per second. The yaw and pitch coordinates correspond to the coordinates of the center (P in FIG. 2B) of the geometrical projection of an image of the view of the base layer, the yaw and pitch coordinates correspond respectively to the angle θ and the angle φ of the point P in the pivot format illustrated in FIG. 7B. The horizontal FOV and vertical FOV parameters correspond respectively to the horizontal and vertical sizes of an image of the extracted view centered on the point P in the pivot format illustrated in FIG. 7B; this image of the extracted view is represented in FIG. 7C.

FIG. 2B illustrates the reference image $I_{ref}$ used to predict the image of the 360° video at the instant t after equirectangular geometrical projection of the image of the base layer illustrated in FIG. 2A.

FIGS. 2D-2G illustrate an embodiment in which two base layers are used. According to this embodiment, the images of the 360° video have a spatial resolution of 3840×1920 pixels and are generated by an equirectangular projection and the 360° image sequence has a frequency of 30 images per second. FIG. 2G illustrates an image of the 360° video at a time instant t encoded in the enhancement layer.

An image at the time instant t of a first view extracted from the 360° video is illustrated in FIG. 2D. This first view is for example extracted from the 360° video by means of the following coordinates: yaw=20°, pitch=5°, horizontal FOV (field of view)=110° and vertical FOV=80°; the spatial resolution of the images of the first extracted view is 1920×960 pixels and the time frequency is 30 images per second.

An image at the time instant t of a second view extracted from the 360° video is illustrated in FIG. 2E. This second view is for example extracted from the 360° video using the coordinates: yaw=20°, pitch=5°, horizontal FOV (field of view)=110° and vertical FOV=80°; the spatial resolution of the images of the first extracted view is 1920×960 pixels and the time frequency is 30 images per second.

FIG. 2F illustrates the reference image $I_{ref}$ used to predict the image of the 360° video at the instant t after equirectangular geometrical projection of the images of the first view and of the second view illustrated respectively in FIGS. 2D and 2E.

In order to project the rebuilt images of the base layers in the reference image, the following steps of geometrical transformation are applied.

The representation of a 360° omnidirectional video in a plane is defined by a geometrical transformation characterizing the way in which a 360° omnidirectional content represented in a sphere is adapted to a representation in a plane. The spherical representation of the data is used as a pivot format; it makes it possible to represent the points captured by the omnidirectional video device. Such an XYZ 3D spherical representation is illustrated in FIG. 7B.

For example, the 360° video is represented by means of an equirectangular geometrical transformation that can be seen as a projection of the points on a cylinder surrounding the sphere. Other geometrical transformations are of course possible, for example a cubemap projection corresponding to a projection of points on a cube enclosing a sphere. The faces of the cubes being finally unfolded on to a plane to form the 2D image. Such a cubemap projection is for example illustrated in FIG. 7A.

FIG. 7D illustrates a more detailed view of the relationship between the different formats mentioned here above. The passage from an equirectangular format A to a cubemap format B is done through a pivot format C characterized by a representation of the samples in a spherical XYZ system illustrated in FIG. 7B. In the same way, the extraction of a view D from the format A is done through this pivot format C. The extraction of a view of the immersive content is characterized by a geometrical transformation, for example by making a rectilinear projection of the points of the sphere along a plane illustrated by the plane ABCD in FIG. 7C. This projection is characterized by parameters of location such as yaw, pitch and the horizontal and vertical field of view (FOV). The mathematical properties of these different geometrical transformations are documented in the document JVET-G1003 (*"Algorithm descriptions of projection format conversion and video quality metrics in 360Lib Version 4"*, Y. Ye, E. Alshina, J. Boyce, *JVET of ITU-T SG16 WP3 and ISO/IEC JTC 1/SC 29/WG 11*, 7th meeting, Turin, IT, 13-21 Jul. 2017).

FIG. 8 illustrates the different steps enabling the passage between two formats. A table of correspondence is first of all built at E80 in order to place the position of each sample in the destination image ($I_{ref}$), in correspondence with its corresponding position in the source format (corresponding to the rebuilt images of the base layers BL[1] and BL[2] in the example described in FIG. 1A). For each position (u,v) in the destination image, the following steps apply:

At E81: passage of the coordinates (u,v) of the destination image into the pivot system XYZ.

At E82: projection of the XYZ coordinates of the pivot system in the source image (u',v').

At E83: updating the table of correspondence relating the positions in the destination format and in the source format.

Once the table of correspondence is built, the value of each pixel (u,v) in the destination image ($I_{ref}$) is interpolated relative to the value of the corresponding positive (u',v') in the source image during a step E84 (corresponding to the rebuilt images of the base layers BL[1] and BL[2] in the example described with reference to FIG. 1A). An interpolation can be done (u'v') before assigning the value in applying a Lanczos type interpolation filter on the decoded image of the base layer at the position placed in correspondence.

At a step 16 of the encoding method illustrated in FIG. 1A, the 360° video is encoded in an enhancement layer EL by prediction relative to the base layers BL[1] and BL[2] in using the reference image $I_{ref}$ generated from the base layers.

At a step 17, the data encoded during the steps 12, 13 and 16 are multiplexed in order to form a binary stream comprising the encoded data of the base layers BL[1] and BL[2] and the enhancement layer EL. The projection data used to build the reference image $I_{ref}$ are also encoded in the binary stream and transmitted to the decoder.

The encoding steps 12, 13 and 16 can advantageously be implemented by standard video encoders, for example by a standard scalable SHVC encoder of the HEVC standard.

FIG. 1B illustrates an example of a binary stream generated according to the method described with reference to FIG. 1A. In this example, the binary stream comprises:

the encoded data of the base layers BL[1] and BL[2], a piece of information PRJ representative of the type of geometrical projection used to represent the omnidirectional content, for example a value indicating an equirectangular projection, a piece of information PRJ_B1, PRJ_B2 respectively, representative of the projection used to extract the view and its location parameters in the 360° video from the view of the base layer BL[1] and BL[2] respectively.

The information representative of the projection and location parameters of a view of the base layer can for example be encoded in the form of coordinates of the view (yaw, pitch, HFOV, VFOV) matched with the type of projection (rectilinear projection) used to extract the view.

The information representative of the parameters of projection and location of a view of a base layer can be encoded only once in the binary stream. It is thus valid for the entire image sequence.

The information representative of the parameters of projection and location of a view of a base layer can be encoded several times in the binary stream, for example at each image, or at each group of images. It is thus valid only for one image or one group of images.

When the information representative of the parameters of projection and location of a view is encoded at each image, such a variant procures the advantage wherein the view extracted at each instant in time of the sequence can correspond to a view of an object that is in motion in this scene and is tracked in the course of time.

When the information representative of parameters of projection and location of a view is encoded for a group of images, such a variant procures the advantage wherein the video sequence encoded in a base layer can change its viewpoint in the course of time thus making it possible to track an event via different viewpoints in the course of time.

FIG. 3 illustrates steps of the method of decoding according to one particular embodiment of the invention.

According to this particular embodiment of the invention, the scalable binary stream representative of the 360° video is demultiplexed during a step 30. The encoded data of the base layers BL[1] and BL[2] in the example described herein are sent to a decoder to be decoded (steps 31, 33 respectively).

Then, the rebuilt images of the base layers are projected (steps 32, 34 respectively) similarly to the encoding method on a reference image $I_{ref}$ to serve as a prediction for the enhancement layer EL. The geometrical projection is carried out from projection data provided in the binary stream (type of projection, information on projection and on location of the view).

The encoded data of the enhancement layer EL are decoded (step 35) and the images of the 360° video are rebuilt in using the reference images $I_{ref}$ generated from geometrical projections made on the base layers, as specified here above.

The scalable binary stream representative of the 360° video thus makes it possible to address any type of receiver. Such a scalable stream also makes each receiver capable of decoding and rebuilding a 2D video or a 360° video according to its capacities.

According to the decoding method described here above, classic receivers such as PCs, television sets, tablets, etc. will decode only one base layer and render a sequence of 2D images, while receivers adapted to 360° video such as virtual reality helmets, smartphones, etc. will decode the base layers and the enhancement layers and render 360° video.

FIG. 4A provides a more detailed illustration of the steps encoding a base layer and an enhancement layer of the method described here above according to one particular embodiment of the invention. Here, we describe the case of the encoding of an enhancement layer encoding a 360° omnidirectional video by prediction from a base layer encoding a view k.

Each image of the view k to be encoded is sub-divided into blocks of pixels and each block of pixels is then encoded classically by spatial or temporal prediction in using a previously built reference image of the sequence of images of the view k.

Classically, a prediction module P determines a prediction for a current block $B^k_c$. The current block $B^k_c$ is encoded by spatial prediction relative to other blocks of the same image or else by temporal prediction relative to a block of a reference image of the view k previously encoded and rebuilt and stored in the memory $MEM^b$.

The prediction residue is obtained in computing the difference between the current block $B^k_c$ and the prediction determined by the prediction module P.

This prediction residue is then transformed by a transformation module T implementing for example a DCT (discrete cosine transform). The transformed coefficients of the residue block are then quantified by a quantification module Q and then encoded by the entropic encoding module C to form the encoded data of the base layer BL[k].

The prediction residue is rebuilt, via an inverse quantification performed by the module $Q^{-1}$ and an inverse transform performed by the module $T^1$ and added to the prediction determined by the prediction module P to rebuild the current block.

The rebuilt current block is then stored in order to rebuild the current image and so that this rebuilt current image can serve as a reference during the encoding of following images of the view k.

When the current image of the view k is rebuilt, a projection module PROJ carries out a geometrical projection of the rebuilt image in the reference image $I_{ref}$ of the 360° video as illustrated in FIG. 2B and according to the geometrical transformation described here above.

The reference image $I_{ref}$ obtained by projection of the rebuilt image of the base layer is stored in the memory of the enhancement layer $MEM^e$.

Just as in the case of the base layer, the 360° omnidirectional video is encoded image by image and block and block. Each block of pixels is encoded classically by spatial or temporal prediction in using a reference image previously rebuilt and stored in the memory $MEM^e$.

Classically, a prediction module P determines a prediction for a current block $B^e_c$ of a current image of the 360° omnidirectional video. The current block $B^e_c$ is encoded by spatial prediction relative to other blocks of the same image or else by temporal prediction relative to a block of a previously encoded and rebuilt reference image of the 360° video, stored in the memory $MEM^e$.

According to the invention, advantageously, the current block $B^e_c$ can also be encoded by interlayer prediction relative to a block co-localized in the reference image $I_{ref}$ obtained from the base layer. For example, such a mode of encoding is reported in the encoded data EL of the enhancement layer by an Inter encoding mode signaling a temporal encoding of the block, a zero motion vector and a reference index indicating the reference image of the memory $MEM^e$ used indicating the image $I_{ref}$. These pieces of information are encoded by an entropic encoder C. Such a particular embodiment of the invention enables the reutilization of the existing syntax of the temporal encoding modes of the existing standards. Other types of signaling are of course possible.

The mode of prediction determined to encode a current block $B^e_c$ is for example selected from among the possible modes of prediction and by selecting the one that minimizes a bit rate/distortion criterion.

Once a prediction mode is selected for the current block $B^e_c$, a prediction residue is obtained by computing the difference between the current block $B^e_c$ and the prediction determined by the prediction module P.

This prediction module is then transformed by a transformation module T implementing for example a DCT (discrete cosine transform) type of transform. The transformed coefficients of the residue block are then quantified by a quantification module Q and then encoded by the entropic encoding module C to form encoded data of the enhancement layer EL.

The prediction residue is rebuilt, via an inverse quantification performed by the module $Q^{-1}$ and an inverse transform performed by the module $T^1$ and added to the prediction determined by the prediction module P to rebuild the current block.

The rebuilt current block is then stored in order to rebuild the current image and each rebuilt current image can serve as a reference during the encoding of following images of the 360° omnidirectional video.

The encoding has been described here in the case of a single view k encoded in a base layer. The method can be easily transposed to the case of several encoded views in an equivalent number of base layers. Each image rebuilt at an time instant t of a base layer is projected on the same reference image $I_{ref}$ of the 360° video to encode an image of the 360° video at the instant t.

FIG. 4B presents the simplified structure of an encoding device COD adapted to implementing the encoding method according to any one of the particular embodiments of the invention described here above.

Such an encoding device comprises a memory MEM4, a processing unit UT4, equipped for example with a processor PROC4.

According to one particular embodiment of the invention, the encoding method is implemented by a computer program PG4 stored in a memory MEM4 and managing the processing unit UT4. The computer program PG4 comprises instructions to implement the steps of the encoding method as described here above when the program is executed by the processor PROC4.

At initialization, the code instructions of the computer program PG4 are for example loaded into a memory (not shown) and then executed by the processor PROC4. The processor PROC4 of the processing unit UT4 implements especially the steps of the encoding method described with reference to FIG. 1A or 4A according to the instructions of the computer program PG4.

According to another particular embodiment of the invention, the encoding method is implemented by functional modules (P, T, Q, $Q^{-1}$, $T^1$, C, PROJ). To this end, the processing unit UT4 cooperates with the different functional modules and the memory MEM4 in order to implement the steps of the encoding method. The memory MEM4 especially includes the memories $MEM^b$, $MEM^e$.

The different functional modules described here above can be in hardware or software form. In hardware form, such a functional module can include a processor, a memory and program code instructions to implement the function corresponding to the module when the code instructions are executed by the processor. In hardware form, such a functional module can be implemented by any type of adapted encoding circuit such as, for example and non-exhaustively, microprocessors, digital signal processors (DSPs), applications specific integrated circuits (ASICs), field programmable gate array (FPGA) circuits, logic unit wiring.

FIG. 5A provides a more detailed illustration of the steps for decoding a base layer and an enhancement layer of the method described here above according to one particular embodiment of the invention. Here, we describe the case of a decoding of an enhancement layer EL encoding a 360° omnidirectional video by prediction from a base layer BL[k] encoding a view k.

The view k and the 360° omnidirectional video are decoded image by image and block by block.

Classically, the data of the base layer BL[k] are decoded by an entropic decoding module D. Then, for a current block of a current image to be rebuilt, a prediction residue is rebuilt via an inverse quantification of the coefficients decoded entropically by an inverse quantification module $Q^{-1}$ and an inverse transform performed by an inverse transform module $T^1$. A prediction module P determines a prediction for the current block on the basis of the signaling data decoded by the entropic decoding module D. The prediction is added to the rebuilt prediction residue to rebuild the current block.

The rebuilt current block is then stored in order to rebuild the current image and so that this rebuilt current image is stored in the memory of reference images of the base layer $MEM^b$ and so that it can serve as a reference during the decoding of following images of the view k.

When the current image of the view k is rebuilt, a projection module PROJ makes a geometrical projection of the rebuilt image in the reference image $I_{ref}$ of the 360° omnidirectional video, as illustrated in FIG. 2B and according to the geometrical transformation described here above.

The reference image $I_{ref}$ obtained by projection of the rebuilt image of the base layer is stored in the memory of reference images of the enhancement layer $MEM^e$.

The data of the enhancement layer EL are decoded by an entropic decoding module D. Then, for a current block of a current image to be rebuilt, a prediction residue is rebuilt via an inverse quantification of the entropically decoded coefficients implemented by an inverse quantification module $Q^{-1}$ and an inverse transform implemented by an inverse transformation module $T^1$. A prediction module determines a prediction for the current block from the signaling data decoded by the entropic decoding module D.

For example, the decoded syntax data indicate that the current block $B^e_c$ is encoded by inter-layer prediction relative to a block co-localized in the reference image $I_{ref}$ obtained from the base layer. The prediction module therefore determines that the prediction corresponds to the block co-located with the current block $B^e_c$ in the reference image $I_{ref}$.

The prediction is added to the rebuilt prediction residue to rebuild the current block. The rebuilt current block is then stored in order to rebuild the current image of the enhancement layer.

This rebuilt image is stored in the reference image memory of the enhancement layer $MEM^e$ to serve as a reference during the decoding of following images of the 360° video.

FIG. 5B presents the simplified structure of a decoding device DEC adapted to implementing the decoding method according to any one of the particular embodiments of the invention described here above.

Such a decoding device comprises a memory MEM5, a processing unit UT5, equipped for example with a processor PROCR5.

According to one particular embodiment of the invention, the decoding method is implemented by a computer program PG5 stored in a memory MEM5 and driving the processing unit UT5. The computer program PG5 comprises instructions to implement the steps of the decoding method as described here above when the program is executed by the processor PROC5.

At initialization, the code instructions of the computer program PG5 are for example loaded into a memory (not shown) and then executed by the processor PROC5. The processor PROC5 of the processing unit UT5 especially implements the steps of the decoding method described in relation to FIG. 3 or 5A, according to the instructions of the computer program PG5.

According to another particular embodiment of the invention, the decoding method is implemented by functional modules (P, $Q^{-1}$, $T^1$, D, PROJ). To this end, the processing unit UT5 cooperates with the different functional modules and the memory MEM5 in order to implement the steps of the decoding method. The memory MEM5 can especially include the memories $MEM^b$, $MEM^e$.

The different functional modules described here above can be in hardware or software form. In hardware form, such a functional module can include a processor, a memory and program code instructions to implement the function corresponding to the module when the code instructions are executed by the processor. In hardware form, such a functional module can be implemented by any type of adapted encoding circuit such as, for example and non-exhaustively, microprocessors, digital signal processors (DSPs), applications specific integrated circuits (ASICs), field programmable gate array (FPGA) circuits, logic unit wiring.

According to one particular embodiment of the invention, the blocks of an image of the enhancement layer are encoded by groups of blocks. Such a group of blocks is also called a tile. Each group of blocks, i.e. each tile, is encoded independently of the other tiles.

Each tile can then be decoded independently of the other tiles. Such tiles (TE0-TE11) are illustrated in FIG. 6A representative of an image of the 360° omnidirectional video at a time instant in which 12 tiles are defined and entirely overlap the image.

The term "independent encoding of tiles" is understood here to mean an encoding of the blocks of a tile that do not use any spatial prediction from a block of another tile of the image, or temporal prediction from a block of a tile of the reference image not co-localized with the current tile.

Each tile is encoded by temporal prediction or inter-layer prediction on the basis of one or more of the base layers as illustrated in FIGS. 6A and 6B. In FIGS. 6A and 6B, the tiles TE4 and TE7 are encoded by inter-layer prediction relative to the image projected in the reference image $I_{ref}$ of the view 1 and of the tiles TE3 and TE6 are encoded by inter-layer projection relative to the image projected in the reference image $I_{ref}$ of the view 2.

According to this particular embodiment of the invention, it can happen that a receiver adapted to decoding and rendering a 360° video decodes only the tiles necessary for the current zone of the 360° image viewed by a user. Indeed, during the rendering of a 360° video, a user cannot, at an instant t, view the entire image of the video, i.e. he cannot look in all directions at the same time and can, at an instant t, view only the zone of the image facing his gaze.

For example, such a viewing zone is represented by the zone ZV of FIG. 6A. Thus, according to this embodiment, only the base layers that have served for the prediction of the zone viewed by the user are decoded at the step 31. In the example described in FIGS. 6A and 6B, only the base layer corresponding to the view 1 is decoded during the step 31 and only the tiles TE4, TE5, TE7 and TE8 are decoded during the step 35 of FIG. 3 on the basis of the enhancement layer EL. During the step 35, only the part of the image of the enhancement layer corresponding to the tiles TE4, TE5, TE7 and TE8 is rebuilt. The particular embodiment described with reference to FIGS. 6A and 6B is described here in the case where the tiles of the enhancement layer EL to be decoded depend on only one base layer (that of the view 1). According to other variants, a tile of the enhancement layer EL can be encoded by prediction from several base layers, as a function for example of the choices of bit rate/distortion optimization made during the encoding of the blocks of the enhancement layer, a block of a tile being possibly encoded by prediction relative to a first base layer and another block of the same tile being possibly encoded by another base layer distinct from the first base layer. In this case, all the base layers used for the prediction of the blocks of a tile of the enhancement layer must be decoded.

To this end, the stream of encoded data comprises, for each tile of the enhancement layer, a piece of information identifying the base layers used to predict the tile.

For example, for each tile, syntax elements indicating the number of base layers used and an identifier of each base layer used are encoded in the data stream. Such syntax elements are decoded for each tile of the enhancement layer to be decoded during the step 35 for decoding the enhancement layer.

The particular embodiment described here limits the use of the resources of the decoder and avoids the decoding of data that is unnecessary because it is not viewed by the user. Such an embodiment can be implemented by any one of the encoding devices and any one of the decoding devices described here above.

The methods of encoding and decoding described here above have been described in the case where the rebuilt images of the base layers are projected at the steps 14 and 15 of FIG. 1A and at the steps 32, 34 of FIG. 3 on a same reference image inserted in the memory of reference images of the enhancement layer.

When the number of base layers is limited, for example when it is 1 or 2, such a reference image has large-sized, non-defined zones, for example set at zero by default, which then use memory resources unnecessarily.

According to other variants, the rebuilt images of the base layers projected on the enhancement layer can be stored in reference sub-images. For example, a sub-image can be used for each base layer. Each sub-image is stored in association with shift information enabling the encoder and/or the decoder to determine the location of the sub-image in the enhancement image. Such a variant gives the advantage of saving memory space by avoiding the need for a reference image in the enhancement layer, for which the majority of the samples are zero.

Such a variant can be implemented independently of the decoder and/or of the encoder.

Although the present disclosure has been described with reference to one or more examples, workers skilled in the art will recognize that changes may be made in form and detail without departing from the scope of the disclosure and/or the appended claims.

What is claimed is:

1. A method for encoding a data stream representative of an omnidirectional video, wherein the method comprises the following acts performed by an encoding device:
    encoding, in said stream, at least one base layer representative of a 2D or 3D video, the 2D or 3D video being representative of a view of a same scene captured by the omnidirectional video; and
    encoding, in said stream, one enhancement layer representative of the omnidirectional video, the enhancement layer being encoded by prediction relative to the at least one base layer,
wherein the prediction of the enhancement layer relative to the at least one base layer comprises, in order to encode one image of the enhancement layer, called enhancement image, for each of said at least one base layer:
    generating a reference sub-image obtained by geometrical projection on said reference sub-image of an image, called a base image, rebuilt from said base layer, said reference sub-image serving as a prediction for said at least one enhancement image,
    storing said reference sub-image in association with shift information enabling an encoder to determine the location of the reference sub-image in the enhancement image in a non-transitory computer-readable memory of reference sub-images of the enhancement layer.

2. The method according to claim 1, wherein the data stream comprises a piece of information representative of a type of a geometrical projection used to represent the omnidirectional video.

3. The method according to claim 1, wherein the view represented by the 2D or 3D video is a view extracted from the omnidirectional video.

4. The method according to claim 3,
    wherein the data stream comprises a piece of information representative of parameters of projection and of location of said base image in an image of the omnidirectional video, said information being used to project the base image on the reference sub-image.

5. The method according to claim 4, wherein said piece of information representative of the parameters of projection of location of said base image is encoded in the data stream at each image of the omnidirectional video.

6. A method for decoding a data stream representative of an omnidirectional video, wherein the method comprises the following acts performed by a decoding device:
    decoding, from said stream, at least one base layer representative of a 2D or 3D video, the 2D or 3D video being representative of a view of a same scene captured by the omnidirectional video,
    decoding, from said stream, one enhancement layer representative of the omnidirectional video, the enhancement layer being decoded by prediction relative to the at least one base layer,
wherein the prediction of the enhancement layer relative to the at least one base layer comprises, in order to decode one image of the enhancement layer, called enhancement image, for each of said at least one base layer:
    generating a reference sub-image obtained by geometrical projection on said reference sub-image of an image, called a base image, rebuilt from said base layer, said reference sub-image serving as a prediction for said at least one enhancement image, storing said reference sub-image in association with shift information enabling a decoder to determine the location of the reference sub-image in the enhancement image in a non-transitory computer-readable memory of reference sub-images of the enhancement layer.

7. The method according to claim 6, wherein the data stream comprises a piece of information representative of a type of a geometrical projection used to represent the omnidirectional video.

8. The method according to claim 6, wherein the view represented by the 2D or 3D video is a view extracted from the omnidirectional video.

9. The method according to claim 8,
wherein the data stream comprises a piece of information representative of parameters of projection and of location of said base image in an image of the omnidirectional video, said information being used to project the base image on the reference sub-image.

10. The method according to claim 9, wherein said piece of information representative of the parameters of projection of location of said base image is encoded in the data stream at each image of the omnidirectional video.

11. The method according to claim 6, wherein the data stream comprises at least two base layers, each base layer being representative of a 2D or 3D video, respectively representative of a view of the scene, the at least two base layers being encoded independently of each other.

12. A device for encoding a data stream representative of an omnidirectional video, wherein the device comprises:
a processor; and
a non-transitory computer-readable medium comprising instructions stored thereon, which when executed by the processor configure the device to:
encode, in said stream, at least one base layer representative of a 2D or 3D video, the 2D or 3D video being representative of a view of a same scene captured by the omnidirectional video; and
encode, in said stream, one enhancement layer representative of the omnidirectional video, the enhancement layer being encoded by predicting the enhancement layer relative to the at least one base layer,
wherein the prediction of the enhancement layer relative to the at least one base layer comprises, in order to encode one image of the enhancement layer, called enhancement image, for each of said at least one base layer:
generating a reference sub-image obtained by geometrical projection on said reference sub-image of an image, called a base image, rebuilt from said base layer, said reference sub-image serving as a prediction for said at least one enhancement image,
storing said reference sub-image in association with shift information enabling an encoder to determine the location of the reference sub-image in the enhancement image in a non-transitory computer-readable memory of reference sub-images of the enhancement layer.

13. A device for decoding a data stream representative of an omnidirectional video, the device comprises:
a processor; and
a non-transitory computer-readable medium comprising instructions stored thereon, which when executed by the processor configure the device to:
decode, in said stream, at least one base layer representative of a 2D or 3D video, the 2D or 3D video being representative of a view of a same scene captured by the omnidirectional video; and
decode, in said stream, one enhancement layer representative of the omnidirectional video, the enhancement layer being decoded by prediction relative to the at least one base layer,
wherein the prediction of the enhancement layer relative to the at least one base layer comprises, in order to decode one image of the enhancement layer, called enhancement image, for each of said at least one base layer:
generating a reference sub-image obtained by geometrical projection on said reference sub-image of an image, called a base image, rebuilt from said base layer, said reference sub-image serving as a prediction for said at least one enhancement image,
storing said reference sub-image in association with shift information enabling a decoder to determine the location of the reference sub-image in the enhancement image in a non-transitory computer-readable memory of reference sub-images of the enhancement layer.

14. A non-transitory computer-readable medium comprising instructions stored thereon, which when executed by a processor of an encoding device or respectively a decoding device configure the encoding device or respectively the decoding device to:
encode or respectively decode a data stream representative of an omnidirectional video by:
encoding or respectively decoding, in said stream, at least one base layer representative of a 2D or 3D video, the 2D or 3D video being representative of a view of a same scene captured by the omnidirectional video; and
encoding or respectively decoding, in said stream, one enhancement layer representative of the omnidirectional video, the enhancement layer being encoded by prediction relative to the at least one base layer,
wherein the prediction of the enhancement layer relative to the at least one base layer comprises, in order to encode at image of the enhancement layer, called enhancement image, for each of said at least one base layer:
generating a reference sub-image obtained by geometrical projection on said reference sub-image of an image, called a base image, rebuilt from said base layer, said reference sub-image serving as a prediction for said at least one enhancement image,
storing said reference sub-image in association with shift information enabling the encoding device or the decoding device to determine the location of the reference sub-image in the enhancement image in a non-transitory computer-readable memory of reference sub-images of the enhancement layer.

* * * * *